Figure 1:
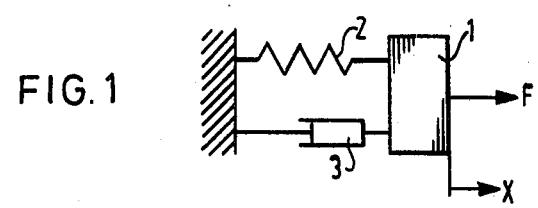

United States Patent [19]

Lam et al.

[11] 4,358,959
[45] Nov. 16, 1982

[54] METHOD AND DEVICE FOR MEASURING THE PARAMETERS OF A DAMPED, SPRING-SUPPORTED MASS

[75] Inventors: Wilhelmus J. Lam, Haarlem; Luitzen De Vries, Amstelveen, both of Netherlands

[73] Assignee: Fokker-VFW B.V., Schiphol-oost, Netherlands

[21] Appl. No.: 140,061

[22] Filed: Apr. 14, 1980

[30] Foreign Application Priority Data

Jan. 23, 1980 [NL] Netherlands .......................... 8000442

[51] Int. Cl.$^3$ .............................................. G01M 5/00
[52] U.S. Cl. ..................................... 73/432 R; 73/574
[58] Field of Search .......... 73/161, 510, 511, 574–576, 73/432 R

[56] References Cited

U.S. PATENT DOCUMENTS 3,416,363 12/1968 Siems ..................................... 73/575
3,836,757 9/1974 Nachtigal et al. ................. 73/575 X

FOREIGN PATENT DOCUMENTS 1251056 9/1967 Fed. Rep. of Germany ........ 73/574
900272 7/1962 United Kingdom .................. 73/575

Primary Examiner—James J. Gill
Attorney, Agent, or Firm—Allison C. Collard; Thomas M. Galgano

[57] ABSTRACT

A method of measuring the rigidity, the damping coefficient and the inertia of a system consisting of a damped, spring-supported mass, particularly, the manually operable member of the control-system of an aircraft or a flight simulator, in which method the measurement of the rigidity takes place by determining the relationship between the force exerted on the mass and the deviation of the mass from the state of equilibrium at a speed and an acceleration of substantially zero value and storing the relationship. The method is characterized by the initial step of forming three electric signals--namely, a force signal having a value directly proportional to the force exerted on the mass, an acceleration signal having a value directly proportional to the acceleration of the mass, and a velocity signal having a value directly proportional to the speed of the mass. Thereafter, the mass is moved in a manner such that it attains an acceleration and a velocity having values differing from substantially zero and the amplitude of the acceleration signal and of the velocity signal is adjusted such that by subtracting these two signals from the force signal substantially the same relationship to the deflection is obtained as in measuring the rigidity. A device for carrying out the method is also provided.

9 Claims, 5 Drawing Figures

METHOD AND DEVICE FOR MEASURING THE PARAMETERS OF A DAMPED, SPRING-SUPPORTED MASS

The invention relates to a method of measuring the rigidity, the damping coefficient and the inertia of a system consisting of a damped, spring-supported mass, particularly the hand- or foot-actuated member of the control-system of an airplane or a flight simulator, in which method the rigidity is measured by determining the relationship between the force exerted on the mass and the deflection of the mass from the state of equilibrium at a speed and an acceleration of substantially zero value, said relationship being stored, and to a device for carrying out such a method.

It is known that a user proportions the force he exerts on a manually actuated member of a control-system with reference to firstly the desired action and secondly the reactive force exerted by the manually actuated member on the user's hand. For a manufacturer desiring to provide a product having preselected properties, the products having to match one another within given tolerances, and, moreover, for detecting any defects of a control-system it is highly important to be able to measure not only the static rigidity but also the damping coefficient and the inertia of the system. Hitherto it has been common practice to determine only the rigidity of the system, for example, by displacing the manually actuated member over a plurality of predetermined distances and by measuring the forces corresponding therewith. It should be noted that for rotary systems the terms "displacement" and "force" are meant here to include angular rotation and torque as well.

The known method of determining the rigidity in terms of the relationship between the force exerted on the mass and the deflection of the mass from the state of equilibrium thereof provides, it is true, important information, but this information is limited to the static or quasi-static cause, that is to say, to shift speeds and shift accelerations not or substantially not deviating from zero. By the setting with the aid of this measuring method in the factory there is consequently obtained only the information restricted to the static case, so that there is a risk of impermissible spread between the damping coefficient and the inertia of the various items, while there is no possibility of detecting any defects of said factors.

For manufacturing and setting a flight simulator it is, of course, of paramount importance that the properties of the airplane to be simulated should be imitated with adequate accuracy in order to give the aircraft apprentice a convincing feeling of reality. Also in this case the problem is involved that the known method only provides the information restricted to the static case, which accounts for the fact that the presently commercially available flight simulators give reasonable results, it is true, but are nevertheless susceptible of appreciable improvements.

In checking airplanes during maintenance cycles, for example, a test criterion may be employed, according to which in the case of deviations of, for example, more than 5 to 10% from the nominal value of the damping coefficient or of the inertia of the measured control-system the apparatus is subjected to a different inspection. It is known from maintenance practice that aircraft may exhibit spread of the various parameters of said order of magnitude, said spred being due on the one hand to manufacturing tolerances and on the other, for example, to ageing.

The invention has for its object to provide a method of measuring the relevant parameters of a system of the kind set forth above, in which not only the static information but also, with adequate accuracy, the data important for the dynamic behavior are obtained. To this end the invention supplements the known method of the kind set forth above by the following steps:

1. Forming three electric signals, namely:
   a. a force signal having a value directly proportional to the force exerted on the mass;
   b. an acceleration signal having a value directly proportional to the acceleration of the mass;
   c. a speed signal having a value directly proportional to the velocity of the mass;
2. Moving said mass in a manner such that it attains an acceleration and a velocity having values differing from substantially zero;
3. Adjusting the amplitude of the acceleration signal and of the velocity signal such that by subtracting these two signals from the force signal substantially the same relationship to the deflection is obtained as in measuring the rigidity.

For explaining the method according to the invention reference is made to the general form of the second-order differential equation which describes the behavior of a second-order system of the kind set forth:

$$F = F_{tot} = cx + d\dot{x} + m\ddot{x}$$

In this equation the left-hand part $F_{tot}$ represents the total force exerted on the system in a given situation. The first term of the right-hand part $cx$ indicates the static, repelling force resulting from the presence of a spring or at least of an element behaving like a spring. The constant c corresponds in this case to the rigidity of the spring. The second term of the right-hand part $d\dot{x}$ represents the damping force occurring, for example, as a result of viscous losses. The third term of the right-hand part $m\ddot{x}$ represents the inertia force i.e. the force required for subjecting the system to a given acceleration. Attention should be paid to the fact that the three terms each relate by their own coefficient to the deflection, the velocity and the acceleration respectively. After the foregoing it will be obvious that in the method according to the invention not only the rigidity of the spring c but also the damping coefficient d and the inertia m can be determined.

It should be noted that the aforesaid second-order differential equation need not be linear. Particularly in practical systems the rigidity c depends upon the deflection, as will be explained hereinafter with reference to measuring results.

A further development of the method according to the invention is that in which in addition an electric deflection signal of a value directly proportional to the deflection of the mass is formed and the velocity signal is derived from the deflection signal by one differentiation with respect to time, whereas the acceleration signal is derived from the deflection signal by two differentiations with respect to time. Such a method, though being mathematically correct, appears in practice to encounter a few problems. One or a repeated differentiation with respect to time involves the risk that high-frequency noise components in the deflection signal give rise to deviations. Therefore, an improved method according to the invention is that in which a deflection signal is derived from the velocity signal by one time integration and the acceleration signal is derived from the velocity signal by one differentiation.

That method according to the invention has appeared to be more practical in which the rigidity is visually displayed in the form of the above-mentioned relationship and the amplitude of the acceleration signal and that of the velocity signal are adjusted so that the visual reproduction of the force signal is identical or substantially identical to that of the rigidity. In a concrete embodiment amplifiers are used, which comprise manually operable potentiometers, which may be calibrated, the visual reproduction of the rigidity signal relationship taking place by recording it on an oscilloscope having a memory or an x-y recorder.

The invention provides furthermore a device for carrying out the aforesaid method, said device being characterized by:

1. memory means for storing the relationship between the force exerted on the mass and the deviation from the state of equilibrium,
2. adjusting means for setting the amplitude of the acceleration signal and the amplitude of the velocity signal,
3. subtracting means for subtracting the acceleration signal and the velocity signal from the force signal, and
4. means for comparing the output signal of the subtracting means of the relationship stored in the memory means.

These memory means may be designed for a visual display of said relationship and be constructed as a memory oscilloscope or an x-y recorder.

As stated above and as is otherwise generally known, the acceleration signal is the first derivative with respect to time to the velocity signal, which, in turn, is the first derivative with respect to time of the deflection signal. For deriving the two signals from one of the other signals according to this principle a device according to the invention is characterised by:

1. a force sensor means for forming the said force signal,
2. a deflection sensor means to form said deflection signal,
3. a differentiator means for deriving said velocity signal from the deflection signal, and
4. a differentiator means for deriving said acceleration signal from the deflection signal or the velocity signal by differentiating with respect to time twice or once, respectively.

In order to avoid the aforesaid problems of the amplification of relatively high-frequency noise a preferred embodiment of the device according to the invention is characterized by:

1. a force sensor means for forming said force signal,
2. a velocity sensor means for forming said velocity signal,
3. an integrator means for deriving the deflection signal from the velocity signal, and
4. a differentiation means for deriving the acceleration signal from the velocity signal.

It should be noted that by the two last-mentioned devices according to the invention an excellent correlation is obtained between the deflection signal, the velocity and the acceleration signal, since these signals are derived one from the other by a mathematical process. The use of independent sensor means for the deflection, the velocity and the acceleration respectively involves, for example, due to ageing phenomena or specimen tolerances, the risk that the desired correlation is not adequately attained.

The invention will now be described more fully with reference to a drawing. Herein show FIG. 1 a simple, mechanical equivalent of a damped mass/spring system for explaining the invention, FIG. 2 a graph of the static relationship between the force exerted on the mass and the deflection thereof, FIG. 3 a graph of a static relationship measured in practice between the force and the deflection, said graph illustrating a few curves recorded during the adjustment of the amplitude of the velocity signal and the acceleration signal, FIG. 4 a possible embodiment of a device in accordance with the invention, FIG. 5 a preferred embodiment of a device in accordance with the invention.

FIG. 1 shows a simple equivalent diagram of a mechanical form of the manually operable member of a control-system, for example, of an aircraft. This system is a damped mass/spring system and comprises a mass 1, a spring 2 and a damping member 3. For the sake of clarity the forces exerted on the mass and the deflection of the mass are designated by the arrow F and the arrow x respectively. To this simplified system applies the above-mentioned differential equation:

$$F = F_{tot} = cx + d\dot{x} + m\ddot{x},$$

wherein
  $F$ = external force(s),
  $c = c(x)$ = position-dependent i.e. non-linear spring rigidity (N/m)
  $d$ = damping coefficient (Ns/m),
  $m$ = mass (kg = Ns$^2$/m),
  $x$ = position (m),
  $\dot{x}$ = velocity (m/s),
  $\ddot{x}$ = acceleration (m/s)$^2$.

Figure 2:
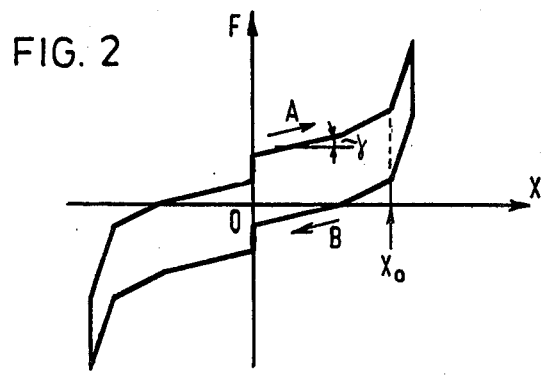

FIG. 2 shows the static diagram in which F is plotted against x. This measurement is carried out in practice not wholly but substantially wholly statically, that is to say: $\dot{x} \approx 0$ and $\ddot{x} \approx 0$. From the graph on FIG. 2 it appears that the rigidity is not constant, since the relationship shown is not represented by a straight line going through zero. The graph shows an angle $\gamma$, which is an angle of inclination at an arbitrarily chosen point of the graph. The tangent of this angle of inclination tan $\gamma(x) = c(x)$ = position-dependent rigidity of the spring 2. From the graph it will be apparent that with an increasing deflection the force gradually increases in accordance with the relationship indicated by the arrow A until at the arrival at the position indicated by $X_O$ there abruptly occurs a considerably larger increase in force. This is indicative of the presence of a mechanical stop. At a return i.e. at a decrease in deflection the graph follows the direction indicated by the arrow B and describes a similar relationship, which in this stylized example is completely symmetrical to the first-mentioned relationship in a negative sense.

Figure 3:
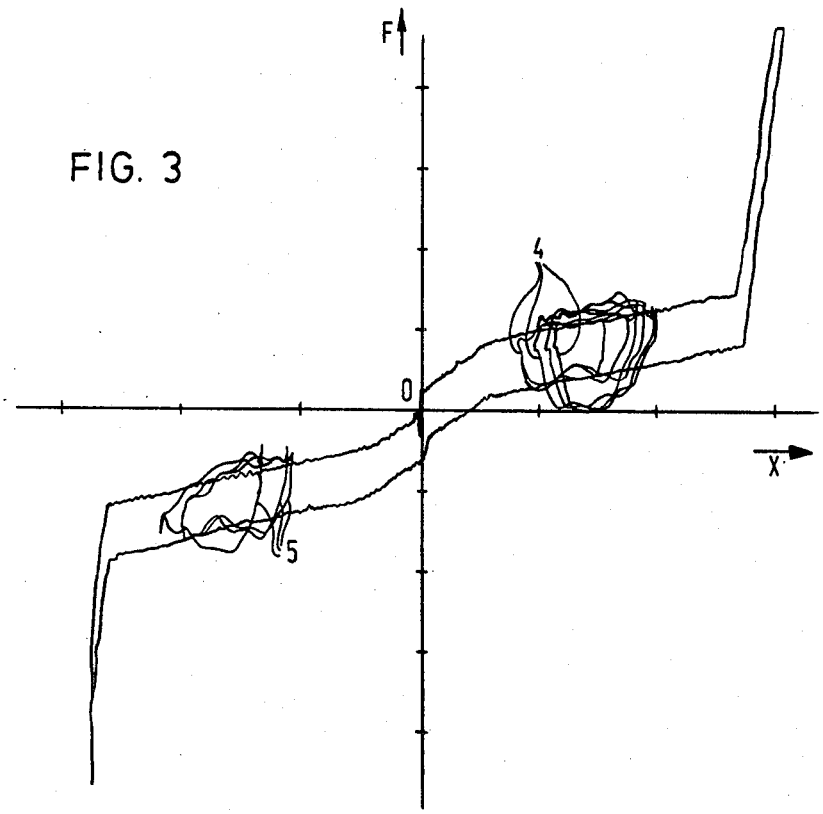

FIG. 3 illustrates a relationship measured in practice between the force dependent upon the deflection and the direction of displacement. It should be noted that the graph of FIG. 3 clearly shows conformities to that of FIG. 2.

After the description of FIGS. 4 and 5 the graph parts 4 and 5 will be discussed.

Figure 4:
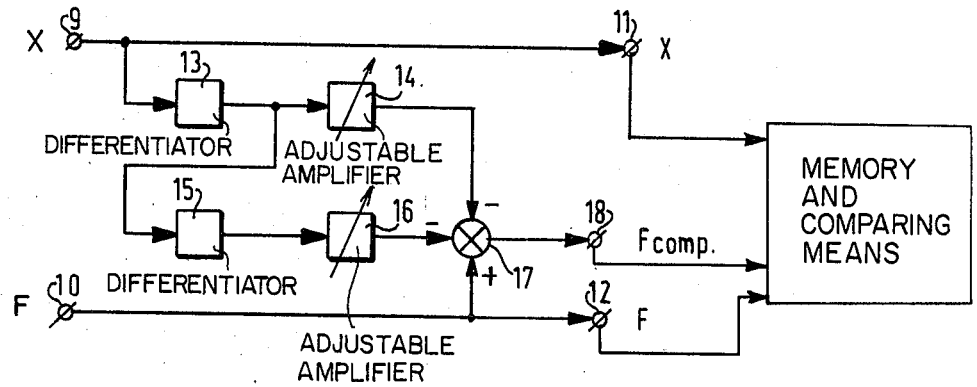

The device shown in FIG. 4 comprises an input terminal 9 to which the position signal has to be applied and an input terminal 10, which is to receive the force signal. These two signals are also available at output terminals 11 and 12. The x-signal is applied to a differentiator 13, which differentiates the x-signal once with respect to time. The output signal x is applied to an amplifier 14 having an adjustable amplification factor and a second differentiator 15, which again differentiates the output signal of the differentiator 13 so that at the output of the differentiator 15 becomes available the acceleration x, which is fed to a second amplifier 16 having an adjustable amplification factor. The force signal is applied not only to the output 12 but also to the positive input an adder/subtractor 17, whose two negative inputs are connected to the output of the amplifier 14 and that of the amplifier 16 respectively. The output signal of the adder/subtractor 17 is applied to an output terminal 18.

In carrying out the method to the invention first the relationship between the signals appearing at the terminals 11 and 12 is graphically displayed. To this end, for example, an x-y recorder is employed. The x-input of the recorder to the output terminal 11 and the y-input of the recorder to the output terminal 12.

Then an assistant operator moves the manually operable member (the mass) with such a speed that a sufficiently strong velocity signal and an acceleration signal are obtained.

Reference will now be made again to the graph parts 4 and 5 shown in FIG. 3. These parts are recorded in the manner described above by first statically deflecting the control-column and by subsequently moving it manually to and from. During these operations the amplifiers 14 and 16, forming part of the device shown in FIG. 4, are adjusted so that the substantially horizontal portions of the graph parts 4 and 5 substantially coincide with the corresponding parts of the static loop. The setting of the amplifier 14 corresponds to the aforesaid damping coefficient d and that of the amplifier 16 to the mass m. The settings of these amplifiers may be enunciated by the calibrated positions of two control-potentiometers.

Figure 5:
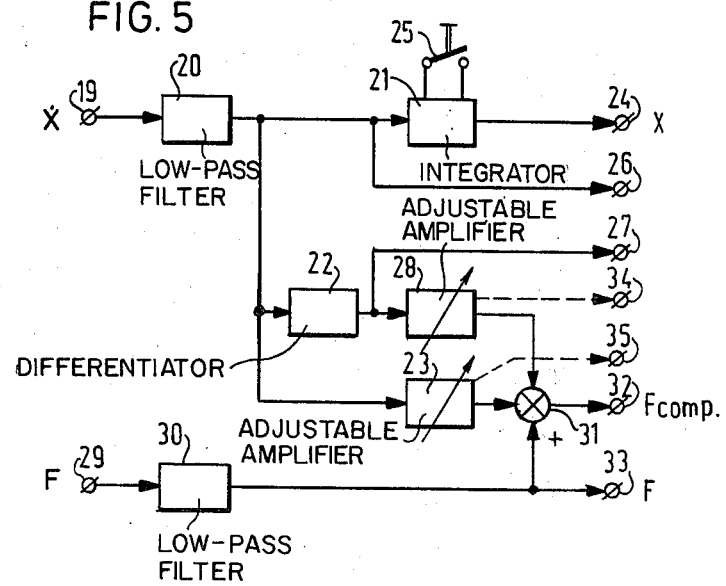

FIG. 5 illustrates a preferred embodiment of a device according to the invention. This device comprises an input terminal 19, to which the velocity signal ẋ has to be applied. This velocity signal is applied to the input of a low-pass filter 20. The device shown in FIG. 5 is specially designed for carrying out measurements at the control-system of an aircraft or a flight simulator. Therefore, the low-pass filter 20 has a second-order characteristic and roll-off frequency of about 5 Hz. The output of said filter is connected to an integrator 21, a differentiator 22 and an amplifier 23 having an adjustable amplification factor. At the output of the low-pass filter 20 appears the filtered velocity signal. By integration in the integrator 21 the position signal is obtained at the output terminal 24 thereof. The integration constant is set by a zero-setting switch 25. An output terminal 26 serves to present the filtered velocity signal. The output of the differentiator 22 is connected to an output terminal 27, at which appears the acceleration signal ẍ. This signal is furthermore applied to a second amplifier 28 having an adjustable amplification factor.

The device comprises a further input terminal 29, to which the force signal has to be applied. As stated above for the velocity signal, this force signal is applied to a low-pass filter 30, which has to be identical to the filter 20 in order to maintain the correlation between the two signals at the terminals 19 and 20. The output signal of this filter 30 is applied to the positive input of an adder/subtractor 31, whose two negative inputs are connected to the amplifiers 23 and 28 respectively. The output signal of the adder/subtractor is applied to an output terminal 32. The filtered force signal is applied not only to the adder/subtractor 31 but also to an output terminal 33. It should be noted that the output terminals 11, 18 and 12 shown in FIG. 4 correspond with the output terminals 24, 32 and 33 shown in FIG. 5.

In the preferred embodiment shown in FIG. 5 it is indicated by a broken line at the amplifiers 28 and 23 respectively that the settings of these amplifiers may be available in the form of an electric signal for external display, for example, in a digital form. To this end the setting indication outputs are connected to two output terminals 34 and 35 respectively, at which a signal corresponding to the mass and a signal corresponding to the damping coefficient respectively are available.

It should be noted that the method according to the invention is extremely suitable for automation. In this case the above-mentioned static relationship is stored, for example, in a digital form in a memory, after which a comparison of these stored data takes place with data obtained by dynamic operation, while the settings of the amplifiers 23 and 28 are automatically readjusted so that the difference between the static and the dynamic stages is minimized.

It has appeared that by the method and the device according to the invention flight simulators can be checked and adjusted so that the dynamic properties of the control-system of an aircraft can be reproduced with great fidelity.

I claim:

1. In a method of measuring the rigidity, the damping coefficient and the inertia of a system comprising a damped, spring-supported mass of the type wherein the measurement of the rigidity takes place by determining the relationship between the force exerted on the mass and the deviation of the mass from the state of equilibrium at a speed and an acceleration of substantially zero value and storing said relationship, the improvement comprising the steps of:
   (1) forming three electric signals—namely:
      (a) a force signal having a value directly proportional to the force exerted on the mass,
      (b) an acceleration signal having a value directly proportional to the acceleration of the mass, and
      (c) a velocity signal having a value directly proportional to the speed of the mass;
   (2) moving said mass in a manner such that it attains an acceleration and a velocity having values differing from substantially zero; and
   (3) adjusting the amplitudes of the acceleration signal and the velocity signal such that by subtracting these two signals from the force signal substantially the same relationship to the deflection is obtained as in measuring the rigidity.

2. The method according to claim 1, additionally including the steps of forming an electric deflection signal having a value directly proportional to the deflection of the mass, deriving the velocity signal from the deflection signal by one differentiation with respect to time, and deriving the acceleration signal from the deflection signal by two differentiations with respect to time.

3. The method according to claim 1, additionally including the steps of deriving a deflection signal from the velocity signal by one integration with respect to time and deriving the acceleration signal from the velocity signal by one differentiation with respect to time.

4. The method according to claim 1, 2 or 3, additionally including the steps of visually displaying the rigidity and changing the amplitudes of the velocity signal and the acceleration signal such that the visual display of the force signal is substantially equal to that of the rigidity.

5. In a device for measuring the rigidity, the damping coefficient and the inertia of a system including a damped, spring-supported mass of the type wherein the measurement of the rigidity takes place by determining the relationship between the force exerted on the mass and the deviation of the mass from the state of equilibrium at a speed and an acceleratiion of substantially zero value, wherein said relationship is stored, wherein three electric signals are formed—namely, a force signal having a value directly proportional to the force exerted on the mass, an acceleration signal having a value directly proportional to the acceleration of the mass, and a velocity signal having a value directly proportional to the speed of the mass, wherein the mass is moved in a manner such that it attains an acceleration and a velocity having values differing from substantially zero, and wherein the amplitudes of the acceleration signal and the velocity signal are adjusted such that by subtracting these two signals from the force signal substantially the same relationship to the deflection is obtained as in measuring the rigidity, the combination comprising:
(1) memory means for storing the relationship between the force exerted on the mass and the deflection from the state of equilibrium at a speed and an acceleration of substantially zero value;
(2) adjusting means including amplifier means having an adjustable amplification factor for setting the amplitudes of an acceleration signal and a velocity signal;
(3) substracting means for subtracting the acceleration signal and the velocity signal from a force signal; and
(4) means for comparing the output signal of the subtracting means to the relationship stored in the memory means.

6. The device according to claim 5, additionally including:
(1) force sensor means for forming said force signal;
(2) deflection sensor means for forming said deflection signal;
(3) differentiator means for deriving said velocity signal from the deflection signal; and
(4) differentiator means for deriving said acceleration signal from the deflection signal.

7. The device according to claim 5, additionally including:
(1) force sensor means for forming said force signal;
(2) velocity sensor means for forming said velocity signal; (3) integrator means for deriving the deflection signal from the velocity signal; and
(4) differentiator means for deriving the acceleration signal from the velocity signal.

8. The device according to claims 5, 6 or 7, wherein said memory means are adapted to visually display said relationship.

9. The device according to claim 5, additionally including:
(1) force sensor means for forming said force signal;
(2) deflection sensor means for forming said deflection signal;
(3) differentiator means for deriving said velocity signal from the deflection signal; and
(4) differentiator means for deriving said acceleration signal from the velocity signal.

* * * * *